United States Patent [19]
Smith et al.

[11] Patent Number: 4,553,263
[45] Date of Patent: Nov. 12, 1985

[54] QUEUED COMMUNITY REPEATER MOBILE

[75] Inventors: Paul F. Smith, Fort Worth; Eric Schorman, Bedford; Timothy M. Burke, Fort Worth; Charles N. Lynk, Jr., Bedford, all of Tex.

[73] Assignee: Motorola, Inc., Schaumburg, Ill.

[21] Appl. No.: 564,855

[22] Filed: Dec. 22, 1983

[51] Int. Cl.[4] .................... H04B 1/00; H04B 1/40
[52] U.S. Cl. ........................ 455/54; 455/17; 455/34; 455/78; 340/825.5
[58] Field of Search ............... 455/7, 11, 17, 18, 33, 455/34, 53, 54, 58, 78; 370/85, 89, 93, 95; 340/825.5, 825.51, 825.52; 179/2 EB

[56] References Cited
U.S. PATENT DOCUMENTS

| 3,745,462 | 7/1973 | Trimble. | |
|---|---|---|---|
| 3,746,991 | 7/1973 | Gautney. | |
| 3,866,175 | 2/1975 | Seifert, Jr. et al. | 340/825.52 |
| 3,955,140 | 5/1976 | Stephens et al. | |
| 4,012,597 | 3/1977 | Lynk, Jr. et al. | |
| 4,013,959 | 3/1977 | Patterson. | |
| 4,135,156 | 1/1979 | Sanders, Jr. et al. | |
| 4,247,947 | 1/1981 | Miyamoto. | |
| 4,332,027 | 5/1982 | Malcolm et al. | 455/58 |
| 4,399,555 | 8/1983 | MacDonald et al. | |
| 4,414,661 | 11/1983 | Karlstrom | 370/95 |
| 4,477,809 | 10/1984 | Bose | 455/54 |

FOREIGN PATENT DOCUMENTS 2063011 5/1981 United Kingdom.

Primary Examiner—Jin F. Ng
Attorney, Agent, or Firm—Donald B. Southard; Raymond A. Jenski

[57] ABSTRACT

A remote unit which transmits and receives messages within a fleet of remote units on a single communications channel shared by a plurality of remote unit fleets is disclosed. Access to the channel is regulated by a central control station which transmits control signals on the channel. To obtain service, a remote unit transmits a request synchronized by one of the control signals. Upon receiving a grant of service from the central control station, the remote unit may transmit a message to its fleet. At the conclusion of the message, an end-of-transmission condition is indicated by the remote unit.

8 Claims, 19 Drawing Figures

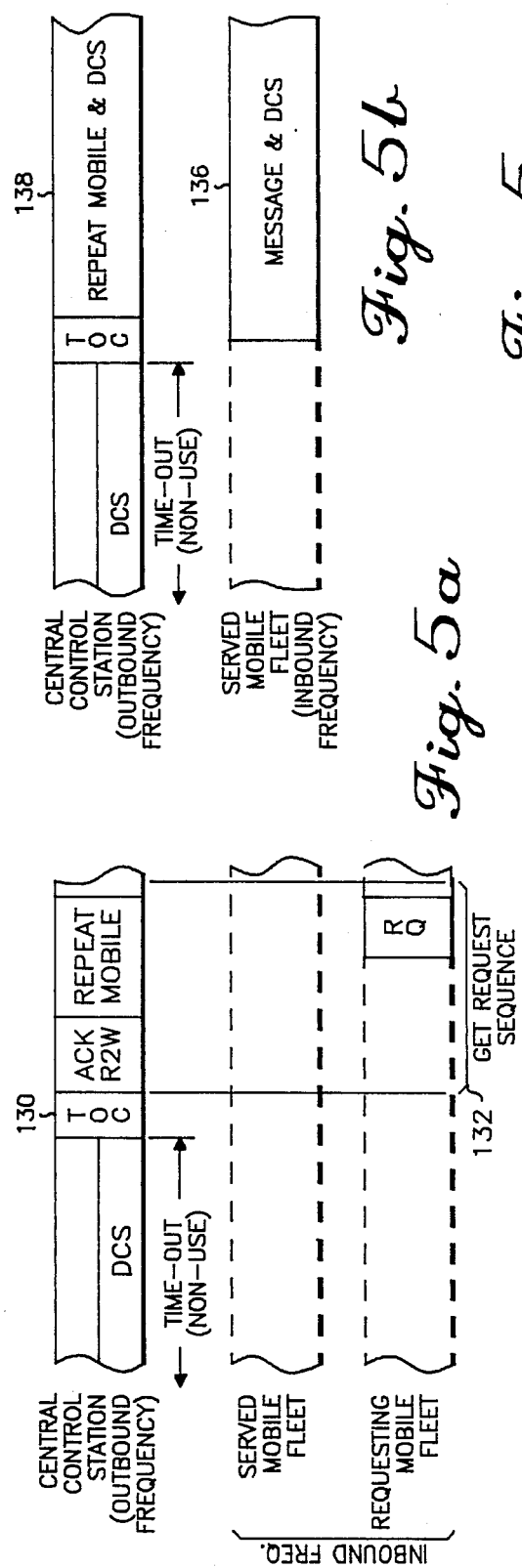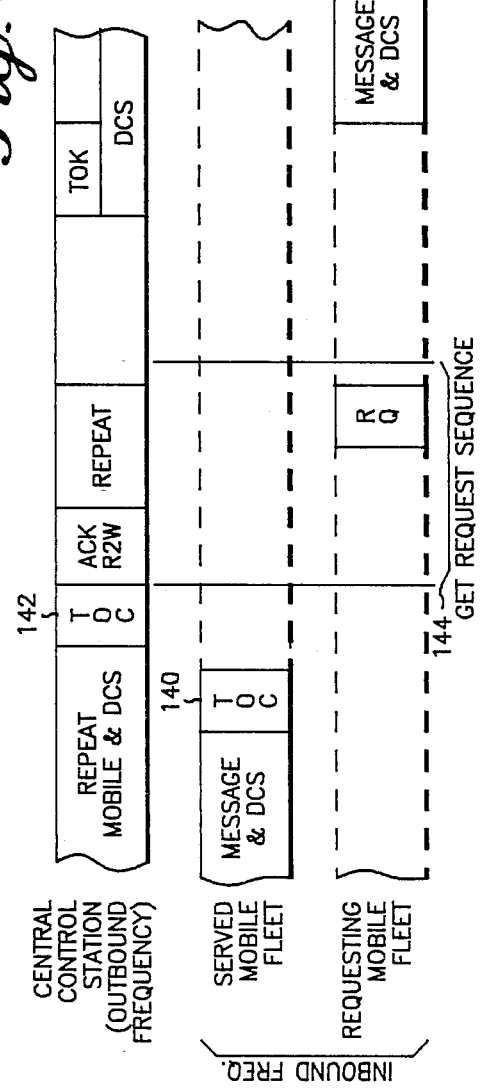
Fig. 5a
Fig. 5b
Fig. 5c

QUEUED COMMUNITY REPEATER MOBILE

BACKGROUND OF THE INVENTION

This invention relates to mobile units employed in a single channel radio communications system. Reference is made to two additional co-pending applications, Ser. Nos. 564,950 and 564,634, filed on the same date as the present application and which contain related subject matter.

Direct mobile-to-mobile radio communication is limited in range by low antenna heights and relatively low power transmitters. In order to overcome these limitations and cover larger geographical areas, the concept of a single channel "community repeater" has developed whereby a receiver is coupled to a higher power transmitter at a location of favorable radio propagation. Signals from a mobile radio transmitter are received by the community repeater receiver and routed to the community repeater transmitter for rebroadcast to receiving mobiles. Many diverse groups of mobile users in the same community can utilize the same "repeater" by transmitting and receiving on the appropriate frequencies. Generally, the type of communication on a community repeater is a "push-to-talk, release-to-listen" message transmission of short duration between one mobile user and a kindred group of at least one other mobile user.

The mobile disclosed herein, in conjunction with the Queued Community Repeater Communications System disclosed in copending application Ser. No. 564,950, resolves the significant user problems encountered when operating on a community repeater system. Crowded conditions can develop on the single communications channel as many different groups consisting of many mobile users attempt to use the channel. Common courtesy is often abandoned as mobile users transmit simultaneously in an effort to capture the channel and communicate their message. Mobile users who listen for a message directed to them or their group are exposed a cacophony of messages which are not of interest and may obscure the desired message.

To improve this situation a number of developments in the mobile equipment, which are now well known, have been made. Mobiles are grouped into formalized "fleets", each with special coding schemes such as continuous subaudible signals or precursor signals which are transmitted by a mobile to activate otherwise muted receivers of other members of its fleet. Directed calls of this sort reduce annoyance to the mobile user, for he no longer has to listen to every message on the channel, but they add to his operating burden as he must monitor the channel before transmitting. Also, even with these developments, access to the channel remains uncontrolled and contentious.

"Trunked" mobile radios used in coordinated multi-channel radio systems have offered better control of communications by being automatically trunked on a plurality of communication channels. Mobile users in these systems must request service from a controller and receive a channel assignment and permission to transmit from the controller before being allowed to transmit on one of the channels. Although these systems are effective in reducing contention, the multi-channel. operation protocol used by the mobiles of these systems is simply unusable for a single communication channel.

In addition to mobile radios remote terminals employed in multi-terminal processing have also generated an extensive need for sharing a scarce resource, i.e. a computer processor, among a large number of users. Terminals equipped to operate in time-sharing systems, which have been developed as a result of the need, typically send both a request for service and its message for storage in a queue. The request is subsequently analyzed by an allocation mechanism for eventual assignment of the message to the computer processor. Unlike the present invention, which must coordinate the requesting process with real time message transmission on the single communications channel, the remote terminal transmits its message to the scarce computer processor (which is aloof from the requesting process) for operation in other than real time.

The present invention, for the first time, affords single channel mobile radio users relief from the aggravations of a crowded communications channel. Users' satisfaction improves once contention for this channel is handled automatically and once necessary user manipulations of the mobile to obtain service on the channel are reduced. In addition, channel efficiency is increased as more mobiles can be accomodated on the single communications channel due to the automated control exercised and the reduction of the need to repeat messages due to interference.

SUMMARY OF THE INVENTION

Accordingly, a primary object of this invention is to provide a mobile unit capable of automatically gaining access to a centrally controlled communications channel shared by a plurality of mobile units.

Another object of this invention is to prevent interfering transmissions from occuring on an occupied channel.

Another object of this invention is to reduce the mobile users' burden in accessing a channel and transmitting a message.

These and other objects are achieved in a remote unit capable of transmitting and receiving messages within a fleet of remote units on a single communications channel shared by a plurality of such fleets. Access to the channel is regulated by a central control station which transmits control signals on the channel. To obtain service, a remote unit transmits a request in response to a control signal received in the gap between served remote unit transmissions. The remote unit transmitter and receiver remain inhibited from communicating a message until the remote unit receives an enabling authorization signal. Upon receiving a grant of service from the central control station, the remote unit is enabled to transmit a message to its fleet. At the conclusion of the message, the remote unit indicates an end-of-transmission condition to inform the central control station of the conclusion.

BRIEF DESCRIPTION OF THE DRAWINGS

FIG. 5a is a relative timing diagram of channel activity showing time-out non-use.

FIG. 5b is a continuation of 5a showing a missed time-out non-use signal and continued mobile unit message transmission.

FIG. 5c is a relative timing diagram of channel activity showing a time out for exceeding the maximum allowed time.

DETAILED DESCRIPTION OF THE PREFERRED EMBODIMENT

The preferred embodiment of this invention is a radio transceiver intended for operation in a Queued Community Repeater (QCR) system. The radio transceiver is a remote unit communicating with other remote units on a single channel via a central control station. The remote radio transceiver is predominantly located in a vehicle, but may be fixed or hand-held, and is hereinafter called a mobile.

Mobiles are organized into "fleets" of units constrained to communicate only with other members of their fleet. Since a plurality of fleets use the same channel, an organizing entity must operate to maintain order. This occurs in the central control station, which provides a signal during pauses of mobile transmissions to coordinate requests for service from mobiles whose fleets are not being served. The central control station receives coordinated requests for service from fleet members, places these requests in a first-in first-out (FIFO) queue for orderly service, and allocates the single communications channel for use by each fleet in turn.

This communications channel is a pair of radio frequencies separated from each other such that mutual interference is avoided. Transmissions from the mobile to a central control station occur on one "inbound" radio frequency and transmissions from the central control station occur on a second, "outbound", radio frequency. When the channel is allocated to a particular fleet of mobiles, one mobile of the fleet may then transmit a message on the inbound frequency. The central control station receives the message and retransmits it to the receiving mobiles of the fleet on the outbound frequency. Control signals from the central control station and requests for service from the mobiles are also transmitted on the outbound and inbound frequencies respectively.

Figure 1:
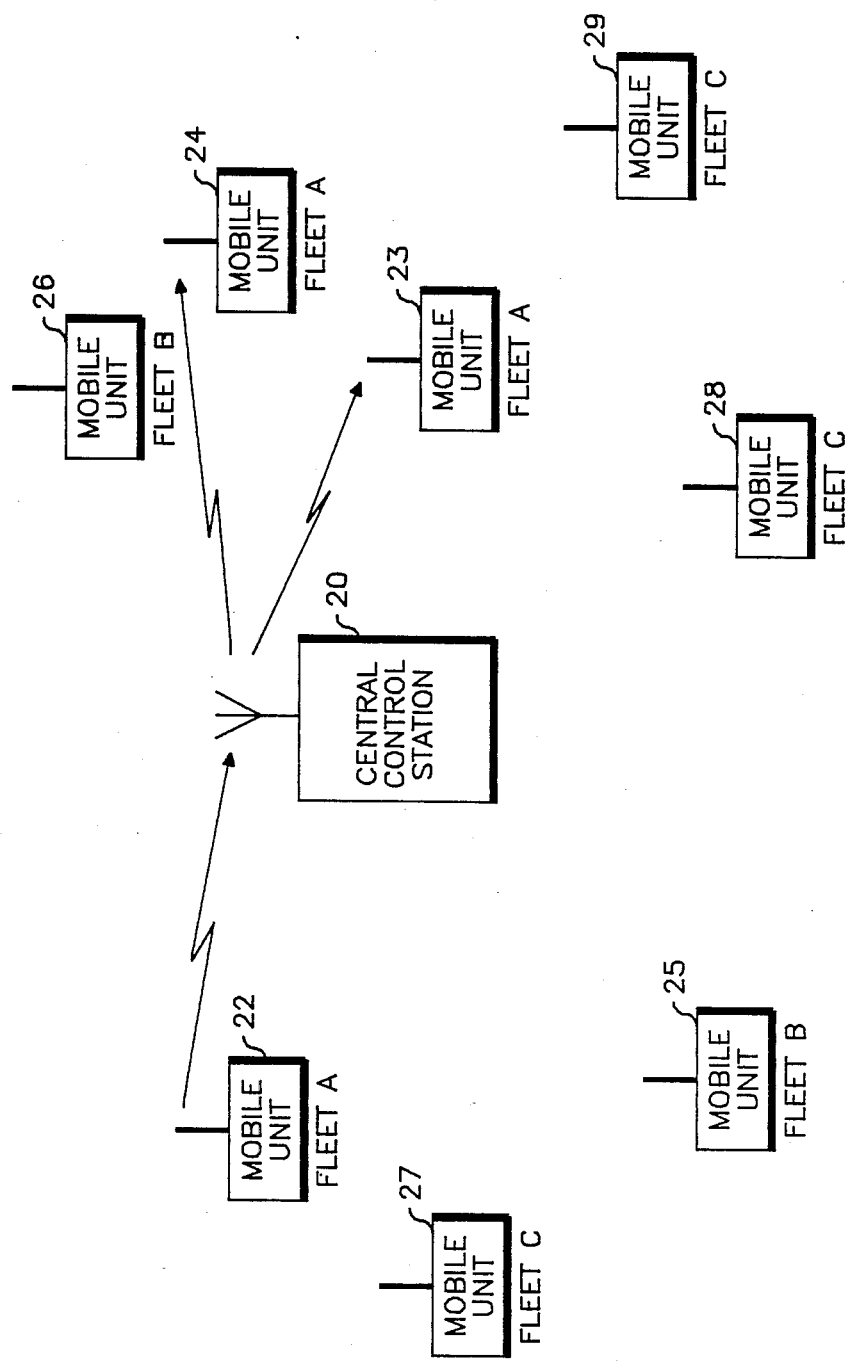
FIG. 1 depicts a queued Community Repeater System with three selected fleets of mobile units.

Referring to FIG. 1 showing an example of a QCR system, three fleets of mobiles, are depicted in the coverage area of a central control station 20. Fleet A is composed of mobiles 22, 23, and 24. Similarly, fleet B is composed of mobiles 25 and 26, and fleet C is composed of mobiles 27, 28, and 29. In the hypothetical situation employed to describe the present invention by example, mobile 22 of fleet A is transmitting a message which is repeated by the central control station 20 to the other mobiles of fleet A. When mobile 22 completes its transmission, it transmits an end-of-transmission Turn-Off-Code (TOC) signal and in response, the central control station 20 provides a period of time wherein a mobile from another fleet may request permission to gain service on the channel. Following this period of time, the channel is re-assigned to fleet A for a possible reply message from one of the other fleet A mobiles.

Figure 2:
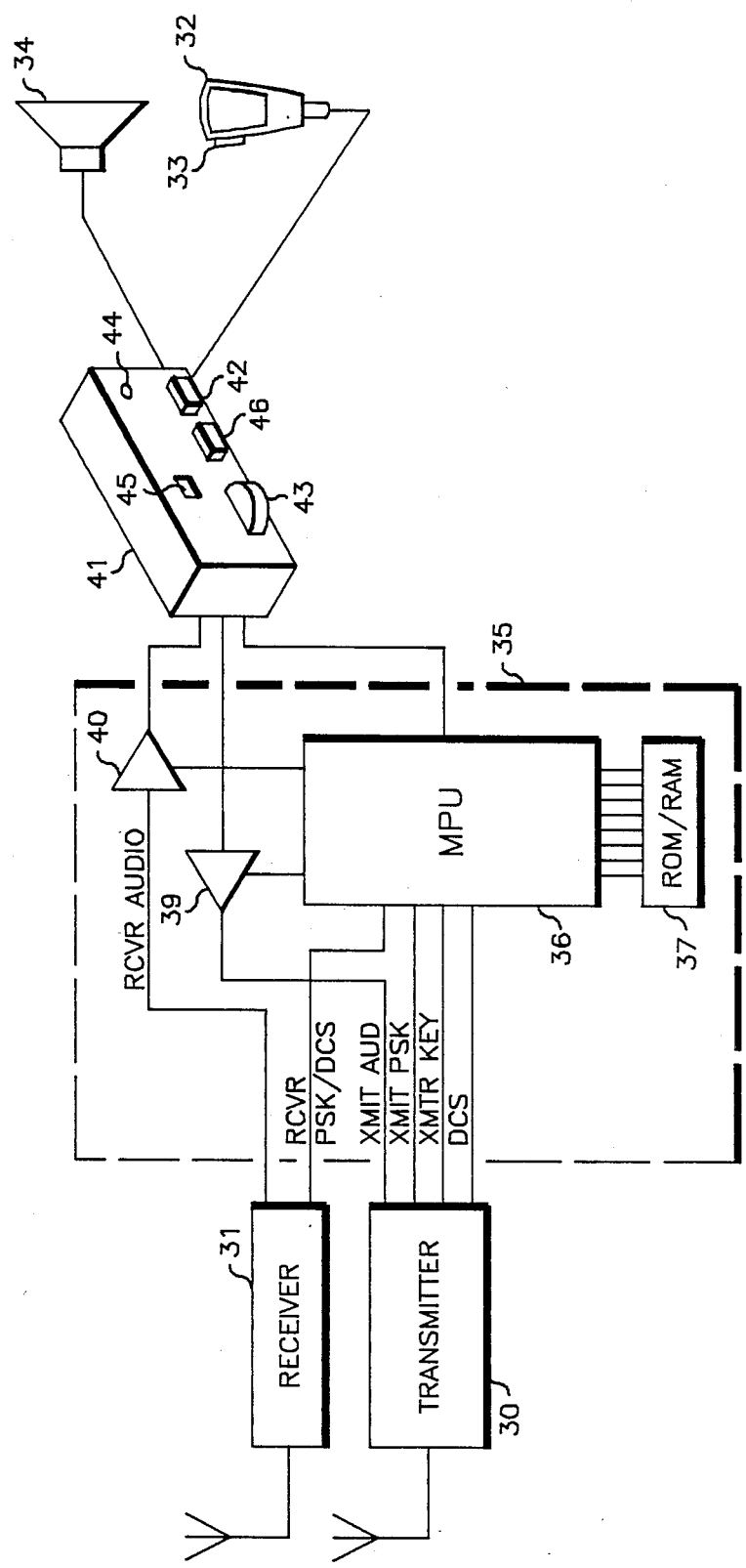
FIG. 2 is a block diagram of one of the mobile units.

A mobile unit, as diagrammed in FIG. 2, consists primarily of a radio transmitter 30, a radio receiver 31, a microphone 32, a push-to-talk (PTT) button 33 located on the microphone 32 and used to indirectly activate the transmitter, a speaker 34 to convert the received message to sound, and a microprocessor control unit 35. The microprocessor control unit 35 itself consists of a microprocessor 36, associated RAM and ROM 37, a microphone audio gate 39, and a receiver audio gate 40.

User interface and control of the mobile is effected by an interface called a control head 41. Controls and indicators available to the user are an off-on switch 42, a volume control 43, a red transmit light 44, a yellow busy light 45, and an optional talk-around (TA) switch 46.

Upon the user pushing the PTT button 33 indicating a desire to communicate a message, a signal is input to microprocessor 36 which responds to its instruction set recalled from ROM/RAM 37 and system data received via receiver 31. When a control signal is received from the central control station 20, the microprocessor 36 activates the mobile transmitter 30 and transmits a burst of PSK data, which in this embodiment is 600 bps, to the central control station 20 to request service. The central control station 20 returns a grant of service on the outbound frequency when the channel is available to the requesting mobile. The grant of service is composed of a PSK "Transmitt OK" (TOK) data packet as well as a digital code signal. This grant of service, received by mobile receiver 31, is coupled to microprocessor 36 which detects the PSK Transmit OK and/or sub-audible digital code signal (DCS) and enables the microphone audio gate 39 and the receiver audio gate 40.

With the mobile unit in the enabled state, the user may now communicate a message by again pushing and holding the PTT button 33 and speaking into the microphone 32. The electrical message signal is conducted through the control head 41 and the microphone audio gate 39 to the transmitter 30 where it is combined with the sub-audible DCS code and transmitted to the central control station 20. Each fleet of mobiles has a DCS code unique to that fleet and used to activate only those mobiles within the fleet.

At the conclusion of the message, the user releases the PTT button 33 causing the microprocessor 36 to generate an end-of-transmission Turn-Off-Code (TOC) DCS burst. The TOC is subsequently transmitted by the mobile transmitter 30 before the microprocessor 36 deactivates the transmitter.

The central control station 20 uses the TOC to activate a request sequence to be described later and subsequently send the fleet DCS code to reactivate the fleet. The mobile of FIG. 2 receives the DCS code in mobile receiver 31 and couples it to the microprocessor 36 where a determination is made whether the received DCS code is the one unique to this mobile's fleet. If it is, a detect is coupled to the microprocessor 36 which enables the microphone audio gate 39 and the receiver/audio gate 40. When another mobile of the fleet transmits on the inbound frequency, the central control station 20 repeats the message on the outbound frequency. This message is received by the mobile receiver 31 and passed through the enabled receiver audio gate 40 and the control head 41 to the speaker 34. The receiver audio gate 40 is disabled when the PTT button 33 is pushed.

The control logic of the mobile is placed in the control head 41 in this embodiment, but it could as easily be located elsewhere in the mobile equipment. When a user presses the PTT button 33 and the channel is unoccupied, the user is given permission to convey a message and is notified by a "go-ahead" beep sounded by the control head 41 and speaker 34. Again pressing the PTT button 33 halts the beep and allows the user to transmit.

However, if the system were busy, pressing the PTT button 33 would cause the control head 41 to sound a "busy" beep and illuminate the busy light 45. The busy light remains illuminated until the requesting mobile's fleet is allocated the channel.

While the channel is busy, several mobile members of a fleet could each attempt to request service. Only one would actually send a request, but all would be beeped when the channel is assigned, and all could possibly collide. To reduce such intra-fleet contention, the first requester is given one beep; and any "secondary" requesters are given two beeps when they are given service on the channel. This is done because the mobile logic knows whether or not it sent a request. The user that hears two beeps knows that another user wanted to talk first.

While a mobile is transmitting, a local time-out timer is initiated by the mobile. The timer times out in 15 seconds in this embodiment and automatically sends the DCS turn off code and deactivates the transmitter. This feature is necessary since the radio cannot decode PSK data or DCS from the repeater (such as a time out) while transmitting. Thus users cannot lock up the system. When the transmit time-out timer expires, the operator is warned with the busy beep which remains until the PTT button 33 is released.

The mobile has an automatic retry for making requests. If a response to a request is not received by the time the next acknowledge is decoded, the mobile assumes that it has been captured and the channel is apparently busy. The mobile will retransmit the request up to 7 times automatically. If a response has not then been obtained, the retry sequence is halted, the busy light is extinquished, and the mobile is put into a channel busy mode. Another press of the PTT 33 will result in the busy beep and the request sequence starting again.

To provide direct mobile to mobile communication, a feature called "talk around" is provided in which the mobiles transmit and receive on the outbound frequency, bypassing the central control station 20. To access the talk around (TA) mode, a user must actuate the TA switch 46. When the PTT button 33 is depressed a "Beginning of Transmission" (BOT) data packet is sent before the message. No DCS is sent during a TA transmission, as this would cause other mobiles to be activated for repeater operation. When the PTT button 33 is released, an End of Transmission Talk Around (EOTTA) is sent. When a non-transmitting mobile receives a BOT with its ID, it unmutes the audio as long as the transmitted carrier is present. When the any data, in particular the EOTTA is received, or a 20 second timer times out, the mobile mutes.

To return the call, the called user must also actuate the TA switch 46. Otherwise, pressing the PTT button 33 will make a normal request of the central control station 20. It is not desirable for a mobile to automatically transfer into the TA mode by receiving BOT/EOTTA because an abuser could keep a fleet in TA by periodically sending out BOT/EOTTA's, thereby inhibiting the fleet from making normal requests.

A mobile not taken out of TA will still detect DCS and PSK data. Therefore it can receive messages directed at its fleet. If the PTT button 33 is pushed, however, the mobile will transmit on the outbound frequency and potentially interfere with the central control station 20 transmissions.

Figure 3:
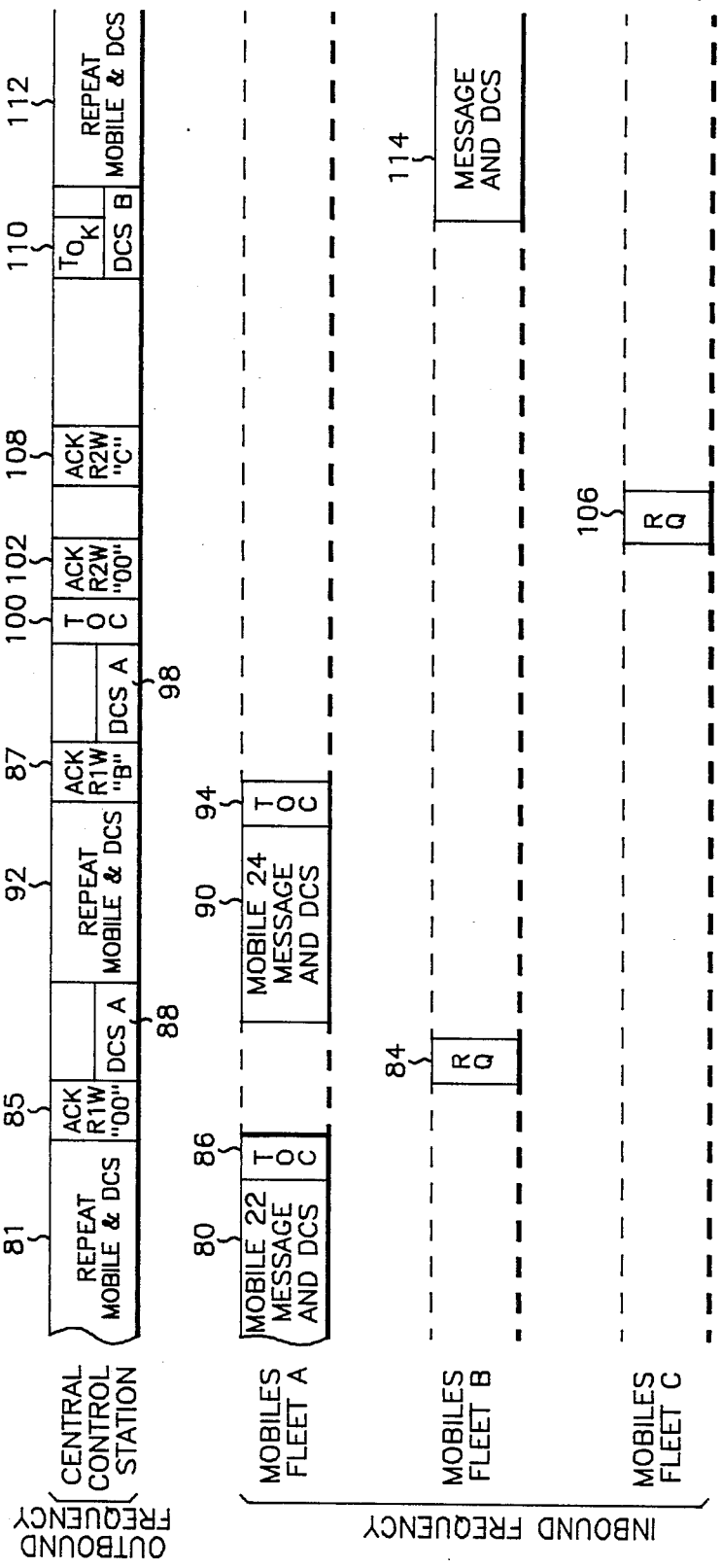
FIG. 3 is a relative timing diagram of the control signals and messages occurring on the channel.

A relative timing diagram for the hypothetica system usage, FIG. 3, provides a clearer illustration of the exchange of control signals between the central control station 20 and mobiles in the coverage area. In this example, mobile 22 of fleet A is transmitting a message 80 on the inbound frequency which is repeated 81 by the central control station 20 on the outbound frequency. Users of mobiles not currently having permission to transmit on the channel, however, may request permission to transmit on the channel during synchronized periods established by the central control station 20. The central control station 20 acknowledges these requests and places the fleet ID's in the FIFO Queue. When the active fleet relinquishes the channel (or when they have exceeded their allotted time) the central control station 20 deactivates the fleet and allocates the channel to the first member of the queue. A member of the newly deactivated fleet may again request service and be placed at the end of the queue.

To prevent the requests for service from interferring with the ongoing conversation of the active fleet, the central control station 20 synchronizes the request sequence to occur in the gap between the voice transmission of the active fleet, fleet A.

All fleets that are not active have the receiver audio disabled in each mobile. Users cannot listen to the conversations of the active fleet, and do not know who, if anyone, is using the channel. In this controlled system, the mobile user does not have to monitor the channel before making a request.

When the user of a fleet B mobile pushes the push-to-talk (PTT) switch indicating a desire to communicate a message to the other members of fleet B, a request for service message 84 is delayed by the mobile until a synchronizing signal 85 is transmitted from the central control station 20. This synchronization signal is an "acknowledge", which is transmitted from the central control station 20 when it detects an end-of-transmission TOC 86 sent by a fleet A mobile when the mobile user releases the PTT switch.

Following an "acknowledge" 85, mobile 25 from fleet B transmits the request for service (RQ) 84 to the central control station 20. An "acknowledge" to fleet B is not made by the central control station 20 at this time, but a subaudible DCS code 88, which is unique to fleet A, is transmitted from the central control station 20. The DCS code 88 causes the muted fleet A mobiles to be re-enabled at the time the fleet B request is finished. The mobiles of fleet A are muted and prevented from transmitting by the data occurring in the gap between transmissions and must wait for the re-authorizing DCS 88 before they may again transmit.

Another mobile 24 of fleet A begins transmitting a message 90 to the mobiles of fleet A via the central control station 20 following the re-authorization DCS code 88. Concurrent with the message of mobile 24, the subaudible DCS code identical to that transmitted from the central control station 20 is transmitted by mobile 24. This mobile transmitted code is detected by the central control station 20 which responsively ceases generation of DCS "A" and causes the central control station 20 to repeat 92 both the mobile message 90 and the DCS "A" generated by mobile 24. Detection of DCS alone is sufficient to enable all mobiles of the fleet corresponding to the particular DCS code transmitted. In this respect, the central control station 20 utilizes a signalling scheme more like a "continuous" than a "preamble" scheme. The continuous signalling allows a mobile which did not receive the initial permission to transmit signal to unmute the receiver and enable the transmitter when the proper DCS code is detected. The user is then able to hear part of the message. This recovery of a "lost" mobile into an ongoing conversation is an invaluable aspect of the QCR mobile.

It is possible for a mobile to make a request, be placed in the queue, receive an acknowledge, and then miss the central control station 20 subsequent authorization. It could miss the authorization due to fading, being out of range, or interference. Whatever the reason, it is desirable to recover this 'dropped' mobile into the system. One method of recovery occurs when a mobile, which is awaiting a grant of service response to its request, misses the grant from the central control station 20. Upon detecting a "channel clear" command, the mobile realizes the grant was missed and automatically restarts the request transmission sequence. The central control station 20 then assigns the channel to the mobile.

Two types of "acknowledge" signals are employed for non-data message transmission: ACKR1W and ACKR2W. The first is an "acknowledge" of a previous request and a solicitation for a new request for service to be taken on the inbound frequency in a "window" of time immediately following the ACKR1W. The second "acknowledge" also confirms a previous request and solicits new requests for service in one of two overlapping time windows randomly selected by the mobile unit so that contention will be minimized. An ACKR2W is repeated in a sequence called "get request" until no further requests are received, thereby increasing the rate at which requests may be gathered after fleet message exchanges are finished on the channel.

When the user of the mobile 24 releases the push-to-talk switch at the end of the message, an end-of-transmission TOC 94 is generated. This TOC, as TOC 86 before, triggers the central control station 20 to transmit an ACKR1W "acknowledge" 87, containing the identification of the last requesting mobile fleet-fleet B in this example and soliciting other requests for service.

Following ACKR1W "acknowledge" 87, the central control station 20 transmits fleet A's DCS code 98 to allow mobiles in fleet A to continue use of the channel. Since no fleet A mobile transmits on the channel, a matching DCS code from a fleet A mobile is not detected at the central control station 20. After a predetermined period of time, the central control station 20 transmits a TOC 100 to deactivate fleet A mobiles and an ACKR2W "acknowledge" 102 notifying all mobiles that requests for service will be accepted before the channel is allocated to fleet B. Any mobiles which were unable to request service during the transmission gaps of fleet A can be added to the queue before reallocation of the channel. In this instance, no new mobile requests for service were received following the previous ACKR1W "acknowledge" 87 and the queue contains only one mobile request (of fleet B) so a dummy ID "00" is transmitted with the ACKR2W 102.

A mobile from fleet C responds to ACKR2W 102 with a request 106 which causes the central control station 20 to transmit an ACKR2W acknowledge 108 with fleet C's identification. This sequence will continue indefinitely as long as requests are received.

Since no additional mobiles respond to the ACKR2W 108 of the "get request" sequence, the central control station 20 selects the proper DCS code of the next mobile fleet in queue, fleet B. This DCS code is transmitted by the central control station 20 concurrently with a permission to transmit (TOK) command 110 forming a grant of service to mobile 25 and fleet B. The TOK is sent for two reasons: it takes other fleets out of a "channel clear" condition to be described later, and it informs mobiles requesting data service that they missed their allocation and should request again.

As the TOK 110 is completed, the central control station 20 continues to send fleet B DCS on the outbound frequency and looks for an identical DCS 114 on the inbound frequency. When the DCS code from a fleet B mobile is detected, the "handshake" is complete, and the central control station 20 stops transmitting fleet B DCS and begins to repeat 112 the incoming fleet B DCS and message 114. Listening fleet B mobiles decode their DCS and are enabled irrespective of whether the DCS code is generated or repeated by the central control station 20. The use of DCS as the authorization allows mobiles to join their fleet's conversation in progress if they power-on or come into range after the initial allocation.

To the non-requesting mobile, all requests, assignments, and messages involving other fleets are ignored. Acknowledgements and other messages involving its own fleet are monitored. Thus, the mobile knows the precise status of its fleet at all times. The mobile user, however, is not aware of (and not burdened by) the status until an actual message is heard on the channel. The mobile knows if its fleet is in the queue but not active. If this user subsequently presses the PTT switch 33 to make a request the yellow busy light 45 goes on immediately. An actual request is not transmitted since the unit knows that its fleet is already in the queue. Thus, only one request per fleet is normally made and contention is greatly reduced.

Figure 4A:
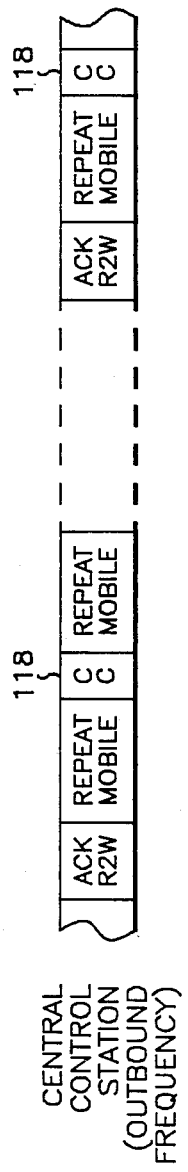
FIG. 4a is a relative timing diagram of channel activity when the central control station is in the "channel clear" mode.

Referring now to FIG. 4A, when there are no fleets in the queue and when the channel is not allocated, the central control station 20 sends out a "channel clear" command 118. This "channel clear 118 command is transmitted periodically at 30 second intervals in this embodiment and is used by the mobiles as a "keep alive" function.

Figure 4B:
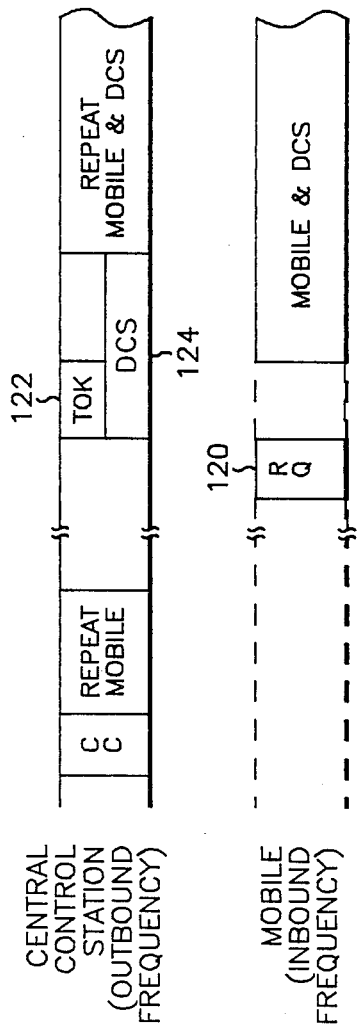
FIG. 4b is a continuation of 4a, showing a mobile unit requesting service during the "channel clear" mode.

As shown in FIG. 4B, a mobile does not have to wait for an "acknowledge" before requesting service when the system is in a "channel clear" condition. When a mobile in the "channel clear" condition sends a request 120, it receives a TOK data packet 122, which also takes other fleets out of the "channel clear" condition, along with a superimposed DCS code 124 which authorizes the requesting fleet. A TOK may thus be considered as a "non-channel clear" command, as well as an enabling transmit OK.

Referring to FIGS. 5A, 5B, and 5C, the central control station 20 performs two time out (TO) functions to deactivate a currently active fleet. A fleet may be timed out for not utilizing the channel (non-use) or for exceeding the maximum time allowable (max-time). When the central control station 20 assigns the channel to a fleet, it starts a time-out non-use (TONU) timer for the fleet. If, as in FIG. 5A, no fleet mobiles respond within the time-out time, as determined by DCS detection, the central control station 20 transmits TOC 130 as a time-out and muting function thereby revoking the grant of service. If a served fleet DCS is not detected by the central control station 20 following the time-out, the central control station 20 adopts a "get request" sequence 132 to solicit requests for service from another fleet.

If a served fleet DCS 136 is detected, FIG. 5B, (a mobile missed the time-out TOC) but the fleet did not yet exceed its maximum allowed time, the central control station 20 will reassign the channel to the fleet by repeating the incoming DCS code 138 to enable the other mobiles. If the maximum allowed time were exceeded, the central control station waits until the mobile DCS drops and performs another time-out to disengage the fleet. When the fleet assignment is revoked, the central control station 20 may make a new assignment.

A fleet is allowed a maximum amount of time to complete an exchange of messages which in this embodiment is in the order of 60 seconds. When the time expires, as in FIG. 5C, the central control station 20 waits for the next end-of-transmission TOC 140 transmitted from the mobile and subsequently checks the status of the queue. If the queue is occupied, the central control station 20 transmits a time-out TOC 142, a "get request" sequence 144 is activated, and the channel is subsequently allocated to the first member in the queue. If the queue is unoccupied, the central control station 20 does not deactivate the current fleet but waits for the next end-of-transmission signal and checks the status of the queue again.

Figure 6:
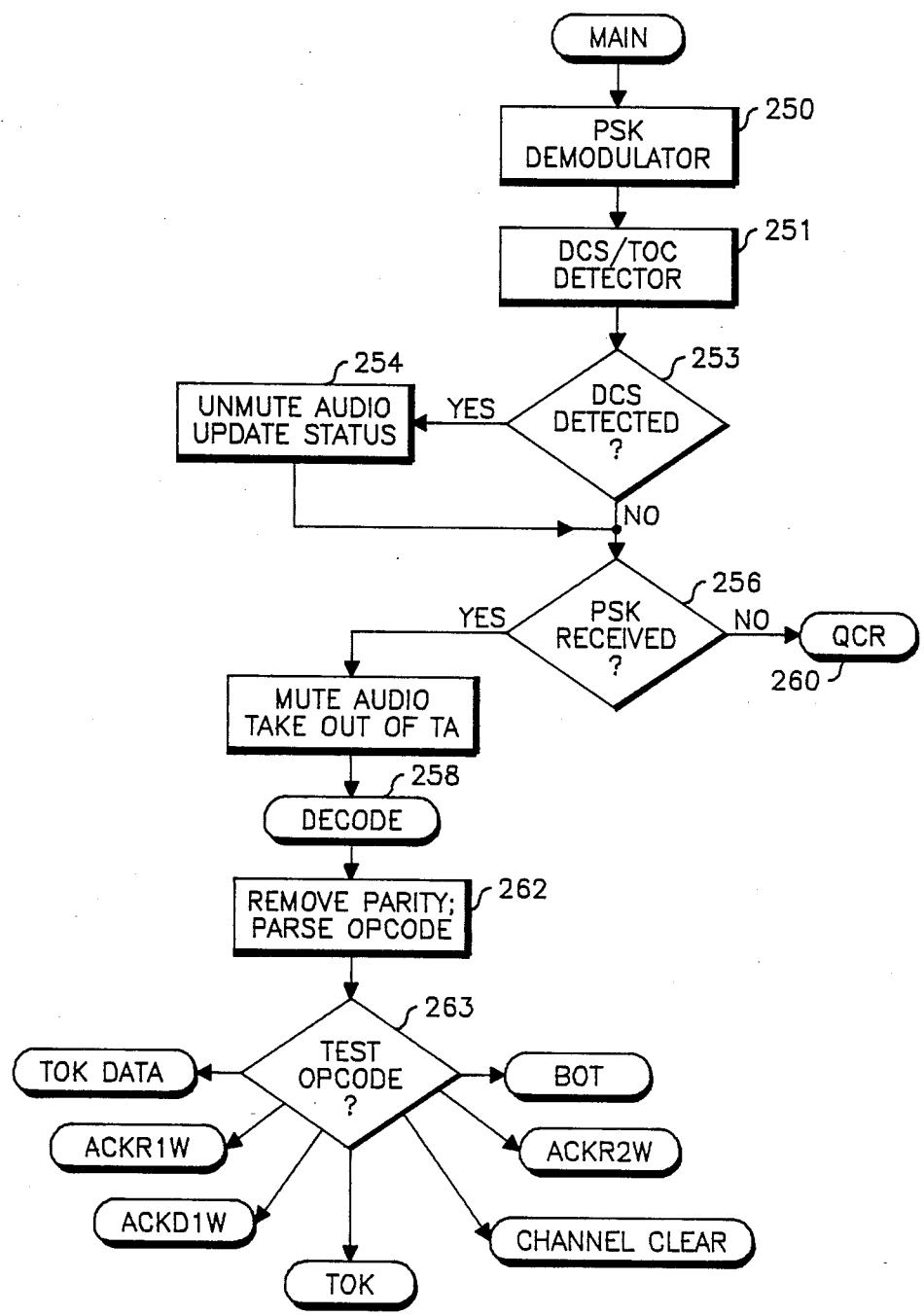
FIG. 6 is a mobile flowchart showing the MAIN routine.

A set of flow charts for the mobile microprocessor instruction set shows mobile response to the system commands. In FIG. 6 the MAIN routine is shown. The mobile microprocessor demodulates the PSK 250 and detects the DCS or TOC 251. If the proper DCS is detected 253, meaning that the system is authorizing mobile units of the instant mobile's fleet to receive a message, the receiver audio is unmuted and other mobile status indicators are set to an authorize state 254. If the proper DCS code is not detected, the microprocessor is instructed to test for the presence of PSK data 256. Even though DCS and PSK are transmitted simultaneously under most conditions, PSK is detected first. A positive test results in a branch to a DECODE subroutine 258; a negative result causes a branch to a QCR subroutine 260.

The DECODE subroutine 258 removes the parity, error corrects, and removes the central control station transmitted opcode from the PSK data 262. A test of the opcode 263 results in a branch to one of seven subroutines to be described later.

Figure 7:
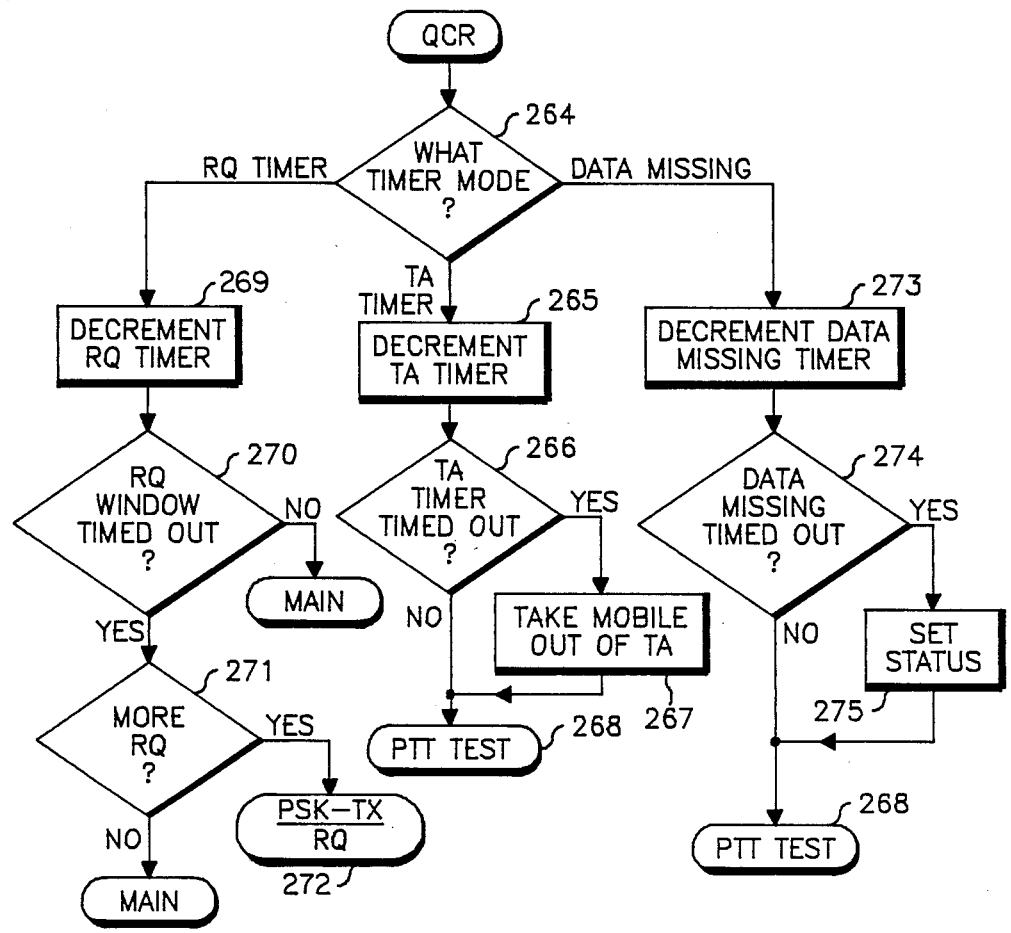
FIG. 7 is a mobile flowchart showing the QCR subroutine.

The QCR subroutine 260 is diagrammed in the block diagram of FIG. 7. This subroutine can perform three timer functions: the "talk around" (TA) timer, the request window for an ACKR2W acknowledge (or a timed out window for an ACKR1W acknowledge), and a "data missing" mobile transmitter disabling function. A decision is made regarding which timer is to be employed 264. If the TA timer is selected, the timer is decremented one count 265 and a test is made to determine if the timer is timed out 266. If the timer times out, the mobile will go out of the TA mode 267. In either condition the program returns to the PTT TEST subroutine 268.

If the RQ timer mode is detected, the RQ timer is decremented one count 269 and the RQ timer is tested for time out 270. A negative result from the RQ timer test 270 returns the program back to the MAIN routine. A positive result causes a check 271 of the number of times the mobile has tried to request service since the PTT button has been pushed. In this particular embodiment, seven attempts to request service are allowed before the request attempt is abandoned and the user notified. If more requests are allowed the PSK-TX subroutine 272 is entered with an internal opcode to cause the transmission of a request for service RQ; if not, the program reverts back to the MAIN routine.

If the data missing timer mode is detected, which is the normal mode, the missing data timer is decremented 273 one count and a test 274 is performed on the remaining count of the timer. A time out, indicating that the mobile has not received central control station data for a period of time, causes the transmitter to be disabled and sets other program flags for a missing data condition 275. A negative result or a completion of the set status step 275 causes the program to enter the PTT-TEST subroutine 268.

Figure 8:
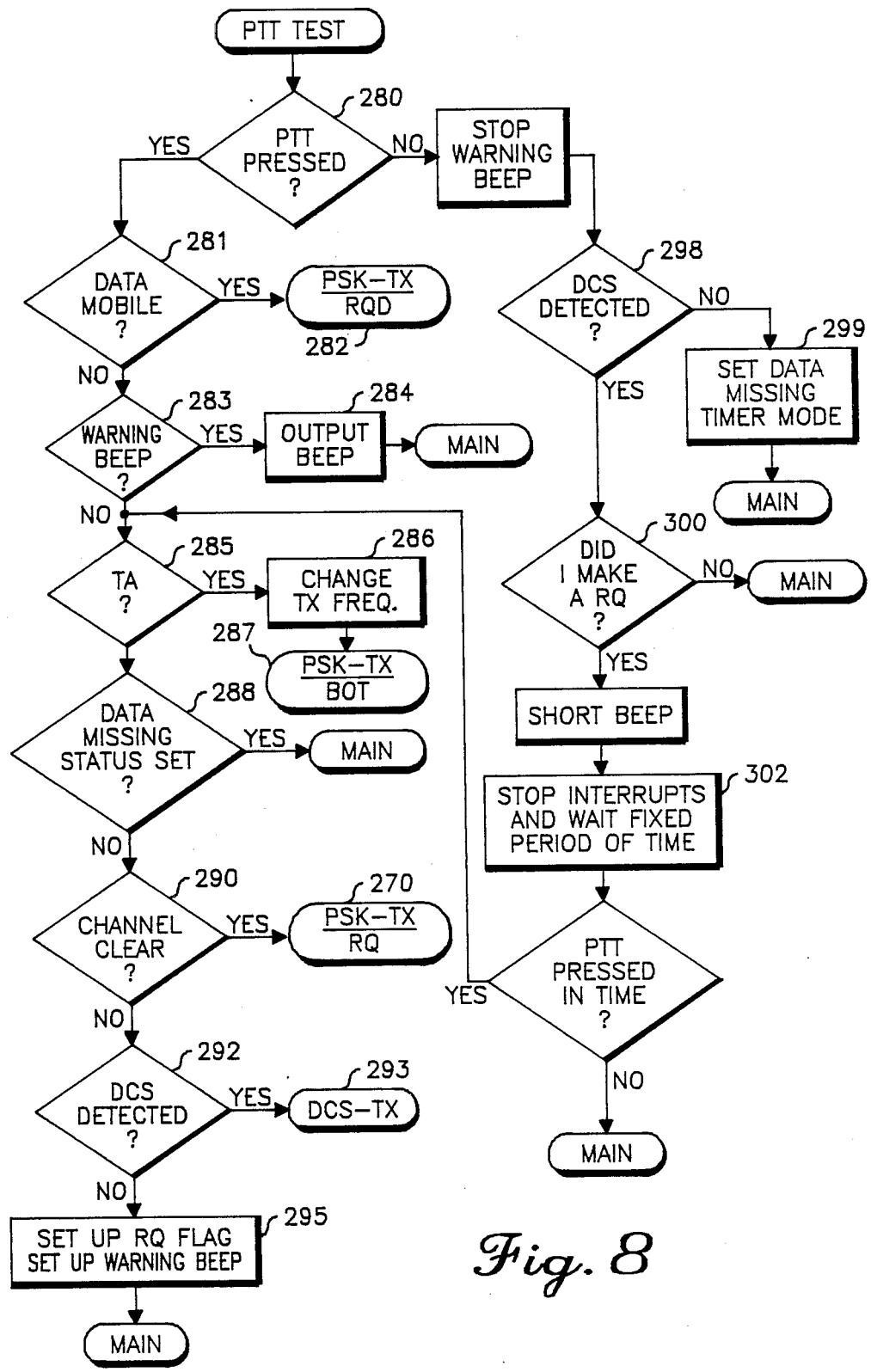
FIG. 8 is a mobile flowchart showing the PTT TEST subroutine.

The PTT-TEST subroutine 268, FIG. 8, samples the voltage level on an input from the PTT button. Depending upon the level, a logic decision is made 280. If the button is pushed, indicating the desire of the user to transmit a message, a series of tests are made to determine the course of action of the mobile.

If the mobile is a data mobile, a data device is activating the PTT line and the program branches 281 to the PSK-TX subroutine 282 with the internal opcode instruction to transmit a data request (RQD). If the mobile is not a data mobile, a need-for-beep is determined 283. A positive result would be caused by a channel busy condition. A test of the TA switch 285 determines if the user wishes to talk directly to another mobile. If the TA switch 46 is activated, the transmit frequency is adjusted to the outbound frequency 286 and the PSK-TX subroutine 287 is entered with an internal opcode to send a BOT. Otherwise, a test is performed 288 to determine if the data missing status has been set in which case the program transfers back to the MAIN routine thereby preventing the keying of the transmitter. If the data missing status is not set, a test for "channel clear" is performed 290 and a positive result sends the mobile directly to the PSK-TX subroutine 270 with the internal opcode RQ to cause the mobile to transmit a request for service and return to the Main Routine. If channel clear is not set, the final test is to determine if the proper DCS were detected. If DCS were detected 292 meaning that the instant mobile's fleet has been authorized to use the authorized to use the channel and that transmission is allowed, the program goes to the DCS-TX subroutine 293. Failing all above tests, indicating that a new request for service sequence is being made by the user pushing his PTT button, a flag is set indicating a desire to send a request 295 and the program returns to the MAIN routine.

If the result of the PTT test 280 yields the fact that the PTT button has not been pushed, two additional tests are made. A check to determine if DCS were detected is made 298 and if DCS were not detected, the data missing timer mode is set 299. If DCS were detected a test 300 is made to determine if the instant mobile made the request for service which is now being granted with the transmission of the proper DCS. If no, the program reverts to the MAIN routine; if yes, the mobile stops all interrupts to the program alerts the user with a beep and waits for a fixed amount of time 302 for the user to press the PTT button. When the PTT button is pressed, the alert beep is stopped and the program rejoins the PTT pressed subroutine. If the PTT is not pressed before the timer times out, the alert is stopped and the program reverts to the MAIN routine.

Figure 9A:
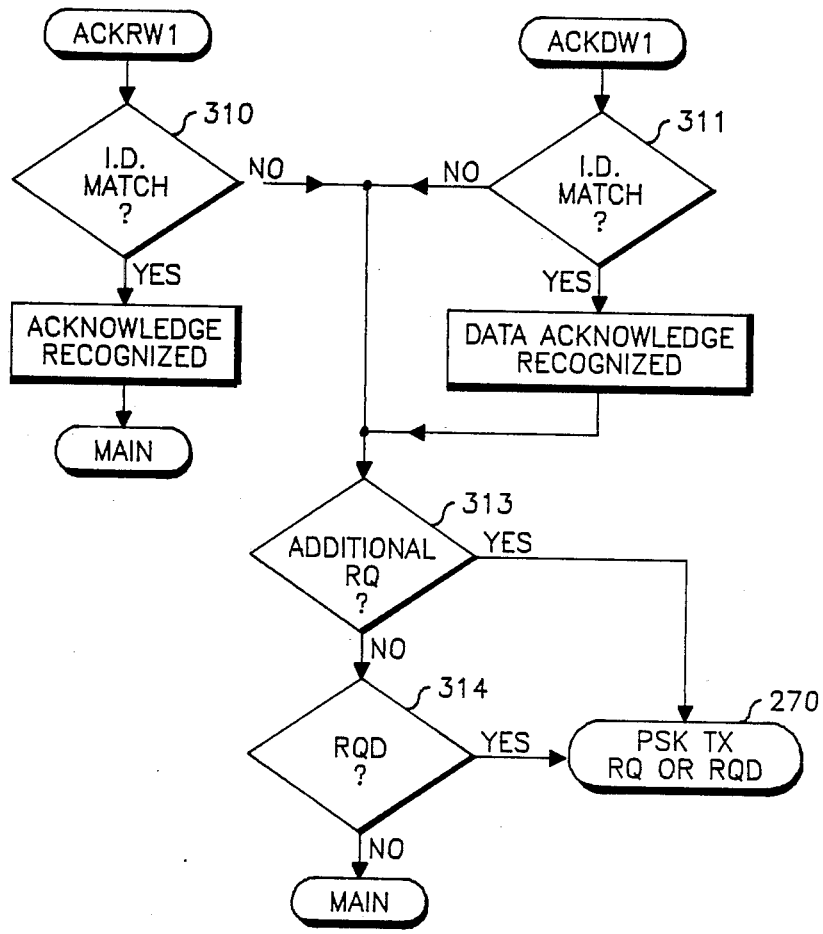
FIG. 9a is a mobile flowchart showing the ACKR1W and ACKD1W subroutines.

As stated earlier, when PSK data is detected and parsed, seven opcodes are available to instruct the mobile in a course of action. Each of these opcode subroutines will now be examined. Referring to FIG. 9A, the flow chart of activities following the reception of an ACKR1W or an ACKD1W acknowledge is diagrammed. Both acknowledgements create a check for ID match 310, 311 and, on an unsuccessful match, decisions 313, 314 are made whether to transmit a request for service (RQ, RQD) via PSK-TX subroutine or not to transmit and return to the MAIN routine. A successful ID match indicates that the instant mobile's fleet is now in the request queue of the central control station and a request transmission is not necessary.

Figure 9B:
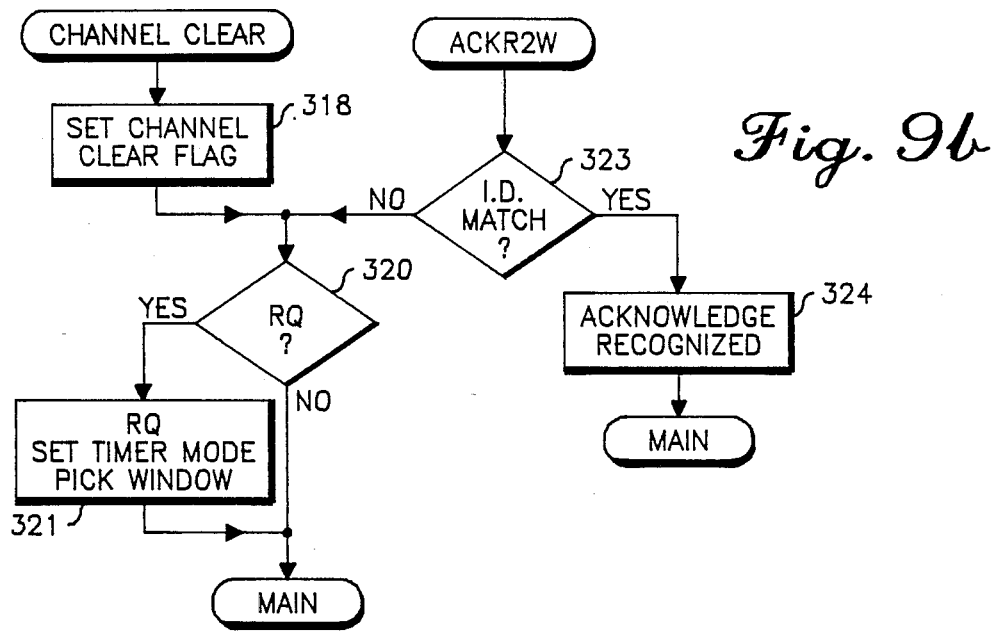
FIG. 9b is a mobile flowchart showing the "channel clear" and ACKR2W subroutines.

The "channel clear" opcode and the ACKR2W opcode responses are shown in FIG. 9B. Detection of "channel clear" results in a "CC" flag being set 318 for use by the PTT test routine and a check 320 if an RQ should be made. If a request is to be made, one of two windows is randomly selected 321 and the RQ timer mode is set before returning to the MAIN routine. The ACKR2W tests for an ID match 323 before selecting a response window 321 on a mismatch. On a match, the acknowledgement of the request of the instant mobile or of another mobile in the same fleet as the instant mobile is recognized 324 and a request transmission is not necessary.

Figure 9D:
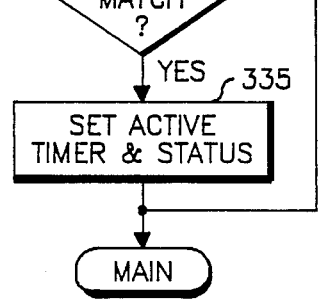
FIG. 9d is a mobile flowchart showing the TOK DATA subroutine.
Figure 9C:
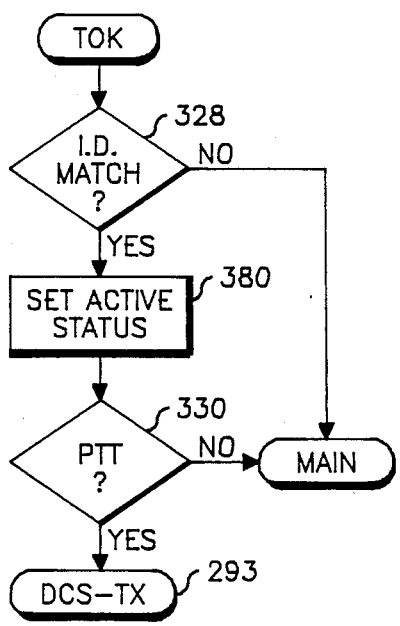
FIG. 9c is a mobile flowchart showing the TOK subroutine.

FIG. 9c diagrams the response to a TOK opcode—a check for an ID match 328 and a branch to the DCS-TX subroutine 293 if the PTT button is pressed 330.

FIG. 9d diagrams the response to a TOK-DATA opcode. TOK-DATA tests for an ID match 334 and sets the active timer and status flags on a positive match 335.

Figure 9E:
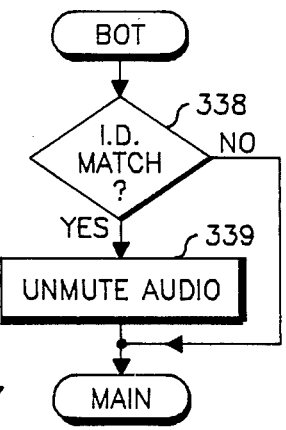
FIG. 9e is a mobile flowchart showing the BOT subroutine.

FIG. 9e diagrams the response of the mobile to a Beginning of Transmit (BOT) signal preceeding a mobile "talk around" message. A check for ID match 338 unmutes the mobile audio 339 on a match.

Figure 10:
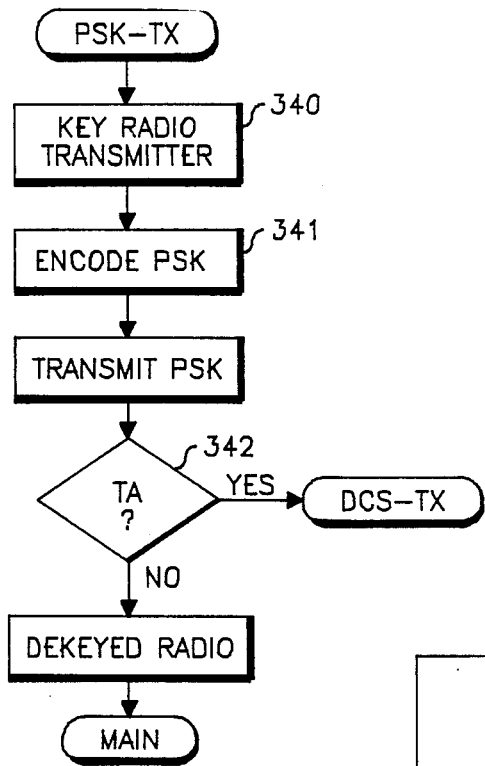
FIG. 10 is a mobile flowchart showing the PSK-TX subroutine.

FIG. 10 diagrams the PSK-TX subroutine which keys the transmitter 340 before encoding the internal opcode which is produced at the exit points of other parts of the program (RQ, RQD, BOT, EOTTA) and adding parity 341. A negative test for TA 342 will dekey the radio 343 before returning to the MAIN routine.

Figure 11:
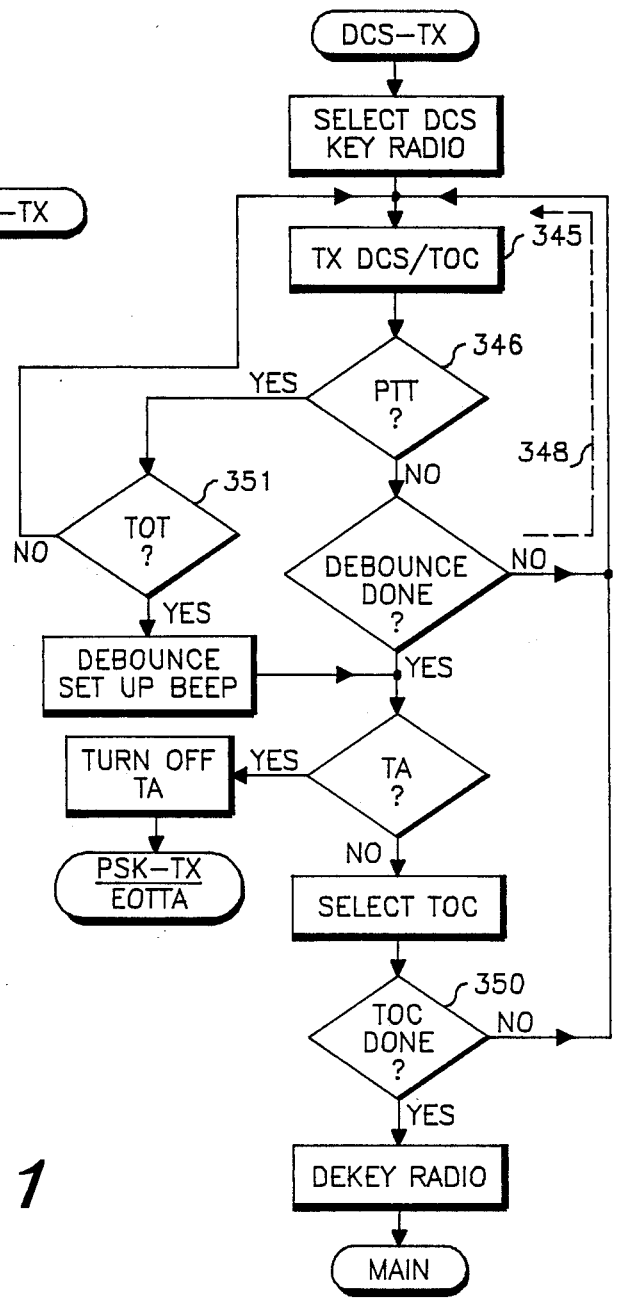
FIG. 11 is a mobile flowchart showing the DCS-TX subroutine.

FIG. 11 diagrams the DCS-TX subroutine which transmits DCS 345 as long as the test for a pressed PTT button is positive. When the PTT button is released, a delay loop 348 is activated which maintains the transmission of DCS for a period long enough to be sure that the PTT button has indeed been released. Upon completion of the debounce delay, a second delay is activated for the DCS/TOC transmitter to transmit TOC and terminated by the TOC done test 350.

A time out timer (TOT) 351 is part of the PTT pressed loop. If a predetermined period of time passes, which in this embodiment is 15 seconds, the mobile is caused to transmit a TOC, deactivate the transmitter, and alert the user. This process is necessary since the mobile cannot decode data, such as time out, while the mobile is transmitting.

The previous functions cooperate in a manner that allows the mobile to communicate with other mobiles in the same fleet. Accordingly, it may be instructive to follow the process of a typical call through the mobile software. Assuming a mobile user pushes his PTT button while the QCR system is occupied with another fleet and starting at MAIN in FIG. 6, the PSK demodulator 250 does not demodulate PSK and the DCS is the wrong code so the program passes to the QCR subroutine 260. Referring to FIG. 7, the missing data has not timed out since data has been recently received and so the program passes to the PTT TEST subroutine 268 on FIG. 8. Since the PTT button has been pressed, the program runs the guantlet of tests: data mobile 281, beep 283, TA 285, data missing 288, channel clear 290, and DCS detected 292. The response to each test is negative, resulting in the RQ flag 295 being set and the beep being enabled.

This sequence continues with the beep test 283 being positive until some parameter changes; in this example, the user releases the PTT button. The mobile program detects the change: PTT is not pressed 280. The data missing timer mode is set so that the next cycle through the program causes the start of the data missing timer. This loop is followed until a mobile in the fleet being served stops transmitting. (The missing data timer is set for a time longer than the QCR system allows any mobile to transmit and therefore times longer than the periods between PSK data).

The central control station generates a PSK data ACKR1W after the detection of served mobile TOC. The instant mobile detects the reception of PSK data 256, FIG. 6, and passes the program to the DECODE subroutine 258. The opcode is tested 263 and found to be an ACKR1W.

Referring to FIG. 9A, the ACKR1W routine tests for an ID match 310 and, since this is the first request made by the instant mobile's fleet, a match is not found. This is the first need for a request 313 and so the program immediately goes to the PSK-TX subroutine 270 with an internal opcode of RQ (request). The PSK-TX subroutine, FIG. 10, encodes the RQ in PSK and transmits the request to the control station. The program passes through the TA test 342 to dekey the radio and return to the MAIN routine.

Until the central control station is ready to assign the channel to the instant mobile, the mobile program cycles through the MAIN-QCR-PTT TEST-MAIN subroutines. When the grant is made, the mobile detects PSK 256 and enters the DECODE subroutine 258. A TOK opcode is found 263 and the subroutine is entered, FIG. 9c. Since the ID transmitted with the TOK is that of the instant mobile, the mobile is placed on an active status 380. If the PTT button is pressed, the program goes directly to the DCS-TX subroutine 293; if not the program goes to the MAIN routine. The MAIN routine leads to the PTT Pressed test 280, FIG. 8, and a DCS detected 298. The control station transmits both TOK and DCS simultaneously, consequently the test 298 is positive. Since the intant mobile made a request, the user is alerted, the program waits a period of time, and upon detection of PTT pressed, the program passes to the DCS-TX subroutine 293 via DCS detected test 292.

Referring to the DCS-TX subroutine in FIG. 11, the mobile transmitter is keyed and the program remains in the PTT TEST 346—TX DCS 345 loop until the PTT button is released. The mobile TOC is then transmitted as described earlier.

Figure 12:
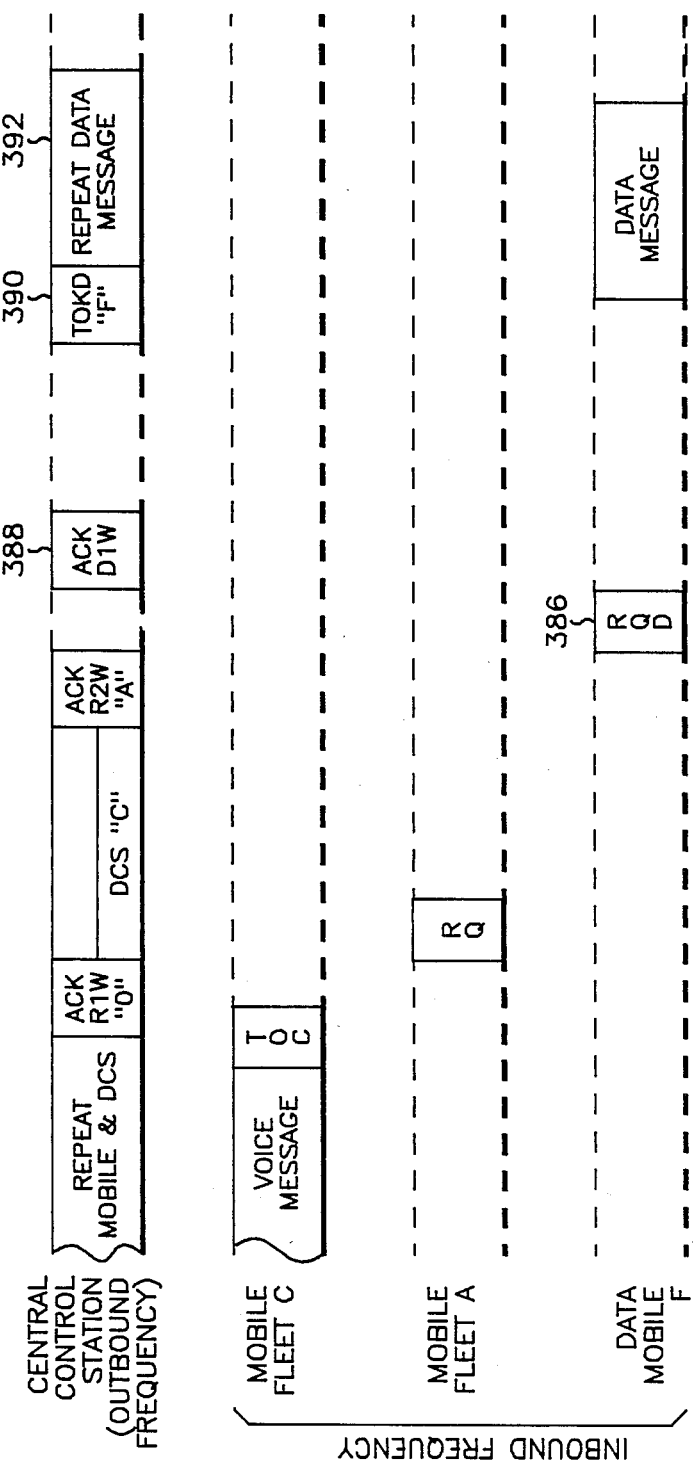
FIG. 12 is a relative timing diagram of channel activity during a data mobile request.

In addition to voice messages, which have been the primary focus of this description, the mobile has the capability of communicating data messages. The timing diagram of channel activity is shown in FIG. 12 for a data message request.

Special opcodes such as RQD, ACKD1W, and TOKD are used by the central control station to control the channel for data communication. A data mobile sends RQD 386 to request data service. The central control station places the requesting data mobile fleet ID in a last-in-first-out stack which is separate from the FIFO voice queue. If the channel is busy, an ACKD1W acknowledge 388 is sent back. When the current voice conversation is timed out, all data fleets will be serviced before the next voice allocation is made.

Data allocation is performed by sending a TOKD 390 with the ID of one data fleet. A brief period of time 392, typically five seconds, is allocated during which the one requesting data mobile fleet is uninhibited and may transmit and receive data. At the end of the repeat period, another data mobile fleet is authorized in the same manner, until all requesting data mobiles have been serviced. Then the first fleet in the normal voice queue is assigned the channel. The fact that data requests are granted before voice requests is not objectionable because of the brief allocation of time for data. For the same reason, the LIFO instead of a FIFO process for data requests is acceptable.

Since all data requests are serviced before the next voice assignment, the decoding of a TOK (voice) by a data mobile indicates that the data mobile missed its assignment. It may then re-request at the next request period. The more complex queue updating performed for voice requests is not needed for data requests.

The mobile of this invention is a novel and necessary component of the Queued Community Repeater system. Operation as heretofore described offers mobile users a significant improvement in their single channel communications. It should be realized, of course, that modifications and variations which may be made on the mobile of this document will still fall within the true spirit and scope of the invention.

We claim:

1. A plurality of remote units each comprising a transmitter and a receiver and adapted to transmit and receive messages within a predetermined fleet of such remote units operating on a single communications channel shared by a plurality of other remote unit fleets and regulated by a central control station which assigns the single communications channel to a requesting remote unit fleet, each message having at least one transmission on the single communications channel, each remote unit comprising:

means for requesting service from the central control station on the single communications channel in response to a control signal received from the central station during a period of time following a served remote unit transmission;

means for receiving a grant of service to the predetermined remote unit fleet transmitted by the central control station on the single communications channel in response to said service request;

means for enabling the transmitter of the requesting remote unit in response to said grant of service and for enabling the receiver of each of the other remote units in the predetermined fleet;

means for indicating an end-of-transmission condition at the conclusion of a real time transmission of the requesting remote unit to inform the central control station of said conclusion and stimulate said control signal from the central control station;

means for disabling the receiver of each remote unit of the predetermined fleet in response to the central control station recognizing an end-of-transmission condition; and means for inhibiting the transmitter of each remote unit of the predetermined fleet if no additional transmissions are made by the predetermined fleet following said received control signal.

2. A plurality of remote units in accordance with claim 1 wherein each remote unit comprises a radio transceiver for transmitting a message on a first frequency of the single communications channel and receiving a message on a second frequency of the single communications channel.

3. A plurality of remote units in accordance with claim 1 wherein each remote unit further comprises means for receiving an acknowledgement control signal transmitted from the central control station in response to a request for service by each remote unit.

4. A plurality of remote units in accordance with claim 3 wherein said requesting means further comprises means for generating a predetermined number of requests for service if said acknowledgement control signal is not received.

5. A plurality of remote units in accordance with claim 1 wherein the requesting remote unit further comprises means for generating a unique authorization signal for transmission when the transmitter of the requesting remote unit is enabled.

6. A plurality of remote units in accordance with claim 5 wherein each other of the remote units in the predetermined fleet further comprises means for receiving said unique authorization signal thereby enabling said each of the other remote units in the predetermined fleet only upon a successful internal comparison to a predetermined standard.

7. A plurality of remote units in accordance with claim 1 wherein said end-of-transmission condition indicating means is a unique signal transmitted at the conclusion of the transmission.

8. A plurality of remote units in accordance with claim 1 wherein each remote unit further comprises means for alerting the remote unit user when a message may be transmitted on the single communications channel.

* * * * *